July 18, 1933.  L. A. ALEXANDER  1,918,581
THREAD CUTTING TOOL
Filed Sept. 15, 1930
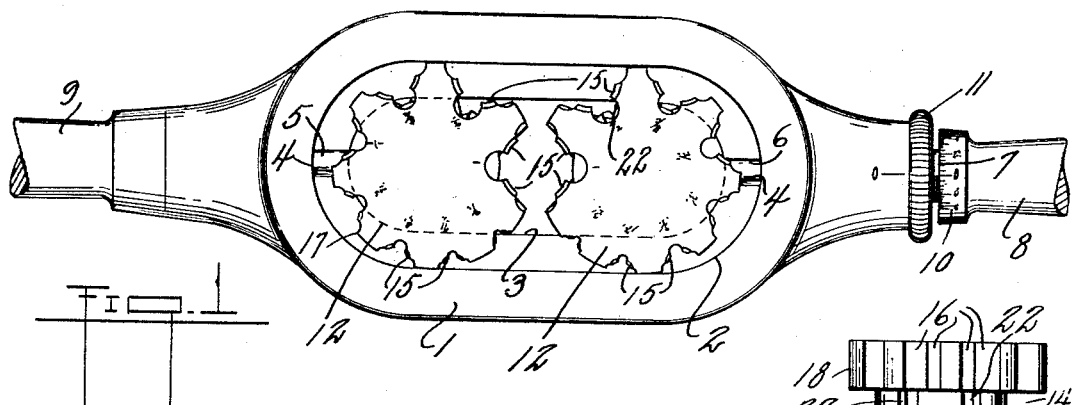
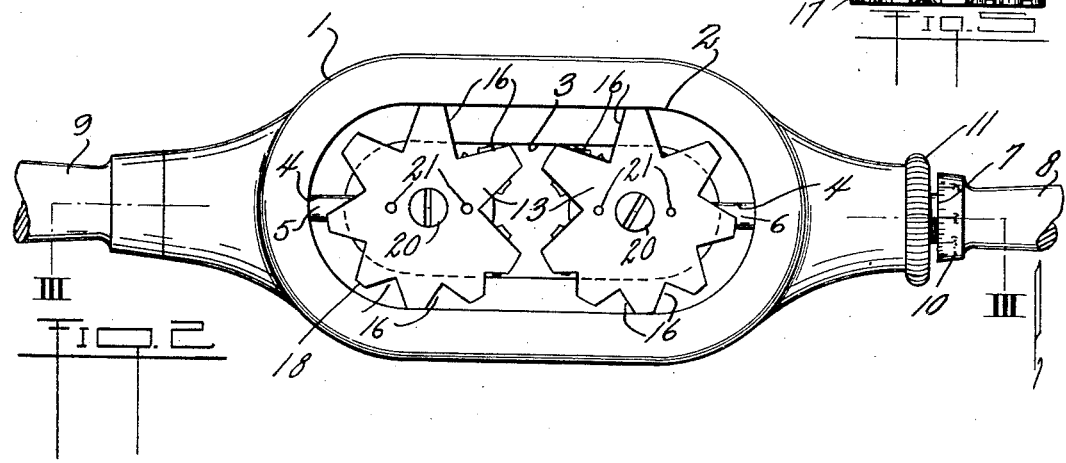
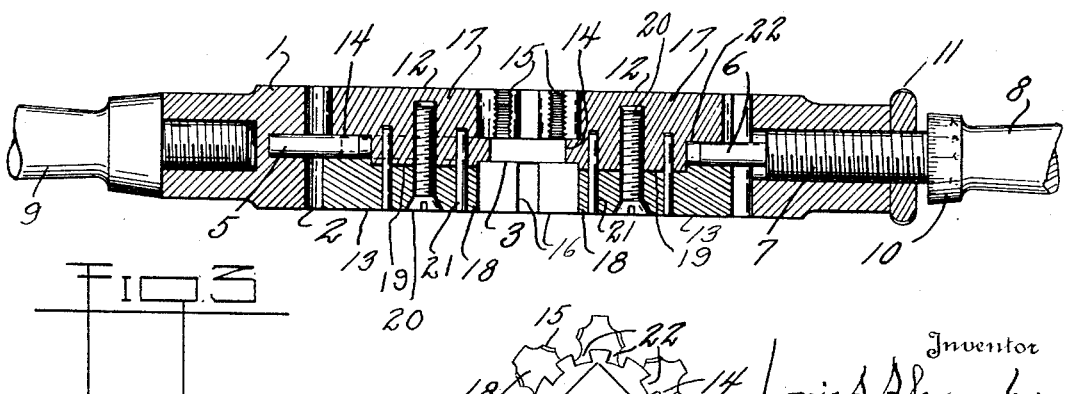
Inventor
Louis A. Alexander
By
Attorney Patented July 18, 1933

1,918,581

UNITED STATES PATENT OFFICE

LOUIS A. ALEXANDER, OF TOLEDO, OHIO

THREAD CUTTING TOOL

Application filed September 15, 1930. Serial No. 481,833.

This invention relates to thread cutting tools.

This invention has utility when incorporated in a tool for cutting various diameter threads.

Referring to the drawing:

Fig. 1 is a view of one side of a tool embodying the invention herein;

Fig. 2 is a view of the opposite side of the tool as shown in Fig. 1;

Fig. 3 is a view on the line III—III, Fig. 2;

Fig. 4 is a plan view of one of the cutting elements; and

Fig. 5 is a side view of one of the tool units.

Tool or die-stock 1 is provided with elongated opening 2 therethrough, centrally through which passes the axis of tool operation. About the opening 2 and extending thereinto is rib 3 carried by the tool-stock 1 and which is provided with a pair of opposing cut out portions 4 at the ends of the opening 2.

At one end of the opening 2, pin 5 is fixed with the tool stock to extend through a cut out region 4 into the opening 2. Through the opposite cut out portion 4 extends pin 6 which is carried as a continuation of threaded portion 7 of handle 8. Oppositely extending from the tool-stock 1 is handle 9 having threaded connection therewith. These handles 8, 9, serve as operating means for the tool, to rotate it about its axis, while rotation of the handle 9 causes the pin 6 to shift longitudinally thereof into and out of the opening 2. Scale 10 on the handle serves as means to measure the length of shift. Lock nut 11 may be used to hold the handle against undesired rotation.

The work is performed by a pair of tool units mounted in opening 2. Each unit is of circular or disk form and provided with faces 12, 13, and annular groove 14 about the periphery thereof.

The rib 3 extends into the groove 14 holding the units assembled with the tool-stock while permitting a rotation thereof as well as a lateral shifting along the opening. About the periphery of the units between the groove 14 and face 12 is a graduated series of thread cutters 15, each unit supplying a pair of cutters which when acting in cooperation with a like pair on the other unit complete a thread or screw cutter.

With the opening or seat 2 only as a nest, the die may thus be complete. However as herein shown there is about the periphery of each unit between the groove 14 and face 13 a graduated series of wrench faces 16 in element 17 of the units.

Each unit comprises two parts or elements 17, 18. The elements 17 is provided with polygonal extension 19 extending into element 18 for insuring proper assembly whereby the axis of each cutter will be the same as the axis of a pair of wrench faces on the opposite side of the unit and keyed therewith against relative rotation. The distance of the wrench faces or ways 16 from the axis is equal to the distance of the root of the corresponding cutter from the same axis. Screws 20 hold the elements 17, 18, together and the assembly is further maintained by means of pins 21.

In cutting a thread, the ways 16 being spaced from the axis as stated above, serve as work engaging guide means to steady the tool during the cutting. They may be used separately however, for gripping a tap or as any other wrench.

The groove 14 at the bottom thereof is provided with a series of notches 22 into which the pins 5, 6, extend during the cutting operation to prevent rotation of the units. The pin 6 being shiftable also serves as an abutment limiting the lateral shifting of the units engaged.

During cutting, the handle 8 may be turned causing the pin to shift to determine the cutting or to take care of slight irregularities in stock dimensions. This adjustment also has utility to cut under or over sized threads; also to open and remove die without running back over thread. When the tool is used as a wrench, the handle, by shifting the pin 8, makes the wrench adjustable.

There is thus provided a single tool capable of cutting a wide range of various diameters of threads. When not cutting, the units may be freely shifted toward the axis of the tool to clear the engaging pin and quickly rotated to bring the desired cutter pair into working position.

What is claimed and it is desired to secure by United States Letters Patent is:—

1. A tool-stock having an opening, a pair of complementary die blocks in the opening and movable toward each other in the plane of the opening into released position for rotation in said plane, said stock having an inwardly extending endless rib about said opening, said blocks each having an annular groove in the plane of the rib to register therewith, said rib and grooves cooperating to prevent the blocks from wobbling relatively to the stock, there being keying means between said blocks and stock effective in shifting of the blocks away from each other for holding the blocks against rotation as to the stock.

2. A tool-stock, a die block therefor having an endless series of die elements, said block having a reduced diameter adjacent the elements, said reduced diameter portion being provided therein with an endless series of radially extending seats, said stock having a slot bounded by a rib cooperating with the block to prevent relative wobbling of the block as to the stock, said block being movable in said slot in the plane of the rib to bring the reduced diameter portion of the block into holding position for the block in the stock, and means at the rib extending in the plane of the rib into a seat of the block thereby holding the block as otherwise free to rotate against such rotation for maintaining the die element in position as to the stock.

LOUIS A. ALEXANDER.